US005368948A

United States Patent [19]

Davies

[11] Patent Number: 5,368,948

[45] Date of Patent: Nov. 29, 1994

[54] MAGNETIC MATERIALS FOR SECURITY APPLICATIONS

[75] Inventor: Dafydd G. Davies, Cambridge, Great Britain

[73] Assignee: Esselte Meto International Produktions, Germany

[21] Appl. No.: 44,111

[22] Filed: Apr. 9, 1993

Related U.S. Application Data

[63] Continuation of Ser. No. 575,866, Aug. 31, 1990, abandoned.

[30] Foreign Application Priority Data

Jan. 9, 1989 [GB] United Kingdom .............. 8900398.2

[51] Int. Cl.[5] .......................... G08B 13/24; B32B 3/00

[52] U.S. Cl. .................................... 428/611; 340/551; 340/572; 428/601

[58] Field of Search ................ 340/572, 551; 428/601, 428/626, 611; 324/262

[56] References Cited

U.S. PATENT DOCUMENTS 3,378,357 4/1968 Alban .................................. 428/680
4,439,294 3/1984 Bril et al. ......................... 204/192 E
4,495,487 1/1985 Kavesh et al. ...................... 340/572
4,636,448 1/1987 Morita et al. ....................... 428/626
4,743,890 5/1988 Hilzinger et al. ................... 340/551
5,175,499 12/1992 Davies ................................ 324/300

FOREIGN PATENT DOCUMENTS 88305134.4 12/1988 European Pat. Off. ............ 428/622

OTHER PUBLICATIONS

Roger Grant & Claire Grant; Chemical Dictionary; 1987; p. 433.

Bozorth, *Ferromagnetism*, 1951 pp. 108–111, 124–125.

*Primary Examiner*—Michael Lewis
*Assistant Examiner*—Stephen G. Kalinchak
*Attorney, Agent, or Firm*—Sixbey, Friedman, Leedom & Ferguson

[57] ABSTRACT

A tag or marker is disclosed which comprises a substrate; an 'active' magnetic material which is a soft magnetic material having a high magnetic permeability and a low coercive force; and a deactivating material which is a hard or semi-hard magnetic material having a moderate or high coercive force and a moderate magnetic permeability, whereby the deactivating material, when subjected to a sufficiently high magnetising force, is able to clamp the magnetic properties of the 'active' material so as to deactivate the 'active' material. The tag or marker is characterised in that the deactivating material is formed by an electrodeposition process, and in that the deactivating layer is nickel.

8 Claims, 2 Drawing Sheets

MAGNETIC MATERIALS FOR SECURITY APPLICATIONS

This is a continuation of PCT/GB90/00024 filed Jan. 9, 1990 which in turn is based upon G.B. patent application no. 8900398.2 filed Jan. 9, 1989. This application is a continuation of Ser. No. 07/575,866, filed Aug. 31, 1990, now abandoned.

BACKGROUND OF THE INVENTION

This application relates to magnetic materials and their use in tags or markers in systems for security tagging, anti-pilferage, article location and article identification.

Anti-pilferage tags or markers are applied to articles of commerce in order to protect them from theft from the sale premises. Similar tags are applied to articles or persons for stock control or identification purposes, being detected when the articles or persons pass or attempt to pass preselected detection stations. The markers are also attached to fixed articles which may be concealed, encased or covered over by other structures or materials; in this case, the articles to which the markers are attached are located by the use of a portable marker detector.

In order to achieve the desired magnetic properties, and in order to minimise the overall size and manufacturing cost of the marker, it is advantageous to manufacture magnetic elements of the marker in the form of thin sheets, foils, or films. There are usually two components to such markers. One is an 'active' magnetic material which has soft magnetic properties, i.e. high permeability and low coercive force (under 100 $Am^{-1}$). The second component is a semi-hard or hard magnetic material, which is often referred to as a 'deactivation' material, and which has a medium permeability and a medium to hard coercive force (over 1000 $Am^{-1}$). The active material produces the detectable signal, and the semi-hard or hard component produces a switchable dc magnetic field which biases or suppresses the response of the active material under appropriate conditions. Both types of material are currently produced using comparatively expensive alloys and processes to achieve the special magnetic properties required. Examples of current alloys are Vacozet, Vitrovac and Crovac from Vacuumschmeltze in Germany; and Arnokrome from Arnolds in the USA. We have identified materials and processes which may result in cheaper production of the magnetic components.

SUMMARY OF THE INVENTION

According to one aspect of the invention, there is provided a magnetically active tag or marker which comprises a substrate; an 'active' magnetic material which is a soft magnetic material having a high magnetic permeability and a low coercive force; and a deactivating material which is a hard or semi-hard magnetic material having a moderate or high coercive force and a moderate magnetic permeability, whereby the deactivating material, when subjected to a sufficiently high magnetising force, is able to clamp the magnetic properties of the 'active' material so as to deactivate the 'active' material, characterised in that at least one of said 'active' material and said deactivating material is formed by an electrodeposition process.

Thus at least one of the 'active' material and the deactivating material is produced by a technique such as electrodeposition, electroforming or electroless chemical deposition. These processes are advantageous for producing thin foils of material with well-defined properties at low cost. They involve deposition of a metal or metallic alloy film from a liquid containing the metallic ions in solution, such as a nickel sulphamate solution; deposition being driven either by electric current or by chemical catalysis. With electroforming, the film is formed onto a mould, die, template, tool or mandrel, and may then be removed as a free-standing foil. The addition of small quantities of organic molecules to the working solution is used to control the stress in the electroformed film. In electrodeposition, the foil is usually deposited onto a metallic or conducting substrate or carrier from which it is not subsequently removed, while in electroless deposition the substrate need not be conducting. A further advantage of using such deposition processes is that the foil may also be formed as discontinuous elements (e.g. dots or islands) or as a sheet with holes, without material cutting or waste, since the area of deposition can be controlled by a simple masking technique. We have discovered that this masking can be achieved either by screen printing of a non-conducting ink or paint onto the metallic substrate, or by the use of an ink roller with a suitable pattern. Alternatively, a reusable mask may be pressed against the substrate during deposition, or photolithographic masking can be used. Another method is to fix non-conducting areas of material such as polymer or resin onto the former or mandrel in the electroforming process. A discontinuous film, or one containing a plurality of holes, is advantageous because the non-uniform shape enhances the magnetic effect of the component in the marking system, particularly the effect of the semi-hard or deactivating element. The ability to form a discontinuous or hole-permeated film or foil in one single process, without the need to subsequently cut or remove material, leads to considerable cost savings in the manufacturing process.

These deposition processes are attractive for forming thin films below about 100 microns, and in particular for films below about 40 microns, since the process costs are lower than for rolling or casting processes, and they are particularly cost-effective for films in the thickness range 5–25 microns. A further advantage of these processes is that the magnetic properties are usually isotropic or uniform in the film plane, so that the materials do not have to be specially oriented during manufacture of the markers. The magnetic performance of the components is thus also isotropic, leading to a better performance of the marker. In contrast, rolled or cast materials tend to have a strong anisotropy—for example, the coercive force may vary by a factor of two for different directions in the film plane, requiring that the material by aligned along specific directions during manufacture of the marker.

The crystal grain structure produced by these deposition processes is often columnar in nature, i.e. long thin crystals with the long axis perpendicular to the foil plane. This gives the advantageous isotropic properties in the plane, as referred to above. For some applications, however, it is desirable to have anisotropic properties. We have discovered that this can be achieved by changing the additives to the electrolyte and changing the deposition conditions in order to achieve planar, rather than columnar, crystal growth. The conditions required to achieve planar grain growth (often referred at as a 'bright' deposition) would be known to a person skilled in these deposition techniques.

With columnar grains, the microscopic magnetic fields associated with the end faces of the columns may lead to unwanted magnetic effects, such as stray magnetic fields, when the material is nominally not magnetised. We have discovered that these effects may be diminished if a thin layer of planar-grain material is deposited on top of the isotropic, columnar material, to form a magnatic short-circuit for the unwanted microscopic magnetic fields.

We have discovered that a suitable material for the active or soft magnetic element is eletrodeposited nickel-iron alloy with 60–100% Ni. Low magnetostriction is achieved with Ni at 75–80%. Some subsequent heat treatment may be necessary if it is required to reduce the coercive force of the foil to a value below about 20 $Am^{-1}$.

Formation of the semi-hard magnetic component by these deposition processes is particularly attractive since in general this is the largest component by volume in the markers. The requirement of this component is a well defined coercive force in the range 1000–15,000 $Am^{-1}$ (depending on the design of the marker). We have found that suitable materials for this component, which can be manufactured in a manner described by this invention, include pure Ni, pure Fe, Ni—Co, Co and Co—W. With the alloys, the relative proportion of the second component is varied to produce the desired coercive force. Alternatively, the coercive force can be controlled by heat treatment such as annealing. We have fabricated electrodeposited samples of all the above materials to produce coercive forces in the desired range and with sufficiently high squareness of the magnetic hysteresis loop to give a magnetic remanence ratio ($M_{remanant}+M_{saturation}$) of over 0.5. In particular, electroformed Ni produced on a drum mandrel can be rapidly and cheaply manufactured without undesirable residual stresses at thicknesses between 2 microns and 100 microns, and with coercive force easily controllable in the range 5000–6000 $Am^{-1}$ without the need for heat treatment. Ni, Co and their alloys are also highly resistant to corrosion. We have found that electroformed Ni foil is also easily cut compared to currently used special alloys, so that pieces or holes may be easily stamped from the foils mechanically.

According to another aspect of the invention, the electrodeposited material is rendered magnetically discontinuous or non-homogeneous by a selective cold-forming or deformation process such as stamping, rolling, processing or embossing. The deformation process changes the magnetic properties, in particular the permeability of the material in the plane of the foil. The purpose of this is that, as described previously, a pattern of changing magnetic properties enhances the structure and efficacy of the magnetic field of the material. The advantage of a deformation process is that it leaves a mechanically continuous foil, with little or no topographic variations, which is simpler and cheaper to handle in subsequent stages such as lamination, and which gives a more uniform surface finish in the final product. In addition, the deformation is simple to implement in comparison with foil masking, or cutting or removing pieces from the foil.

BRIEF DESCRIPTION OF THE SEVERAL FIGURES

The invention will be illustrated by the following Examples, which are of non-limiting of the scope of the invention. Reference is made, in the following, to the accompanying drawings, in which:

FIG. 1*a* illustrates a press tool used in one embodiment of the invention;

FIG. 1*b* is an enlarged view of a part of the tool shown in FIG. 1*a;*

DETAILED DESCRIPTION OF THE PREFERRED EMBODIMENTS

Figure 1A:
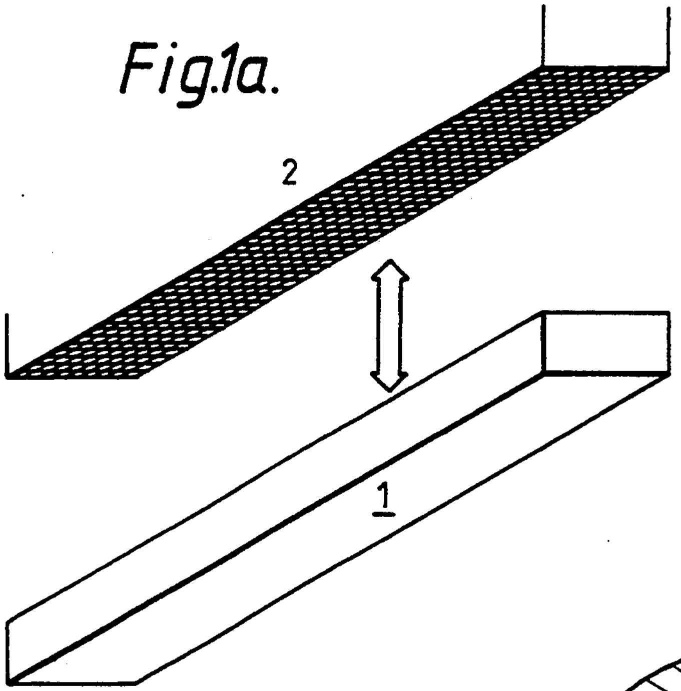

Reference will be made to the drawings in the Examples which now follow.

EXAMPLE 1

This Example describes the manufacture of a deactivation material from electroformed nickel foil. A continuous roll of electroformed plain nickel foil having a thickness of 20 microns was purchased from INCO Alloys Ltd in the UK. The foil was then annealed for 24 hours at a temperature of 280° C., followed by a 24 hour cooling period to room temperature. This reduced the coercive force from 6000 kA/m to 2000 kA/m, which was the required value for this particular application. The finished material was in the form of a roll of width 50 cm. This roll was then slit to rolls of width 8 mm, and then used as the deactivator supply material for lamination with other components in an anti-pilferage label manufacturing process.

EXAMPLE 2

This Example describes the manufacture of a hole-permeated foil of deactivation material using an electroforming process. The same electrolytic process and conditions as in Example 1 were used, but the forming mandrel consisted of a titanium drum of width 50 cm, covered with a continuous array (based on a hexagonal lattice) of circular embedded epoxy resin islands of diameter 1.5 mm and centre to centre spacing of 3 mm. The resin was embedded in depressions of the appropriate size machined into the titanium drum to a depth of 1 mm, and the resin was then machined back to be flush with the drum surface. Electroforming the foil on this mandrel produced a 20 micron thick nickel foil which could be produced continuously and which had 1.5 mm circular holes the pattern of which corresponded to the pattern of the epoxy resin islands. The foil was then annealed in the manner described in Example 1. Finally, the foil was laminated to a continuous foil-like 'active' magnetic material which had been deposited on a 25 micron polymer film. The advantage of this process is that the active material and the deactivation material may be handled as continuous webs for the lamination process, and thereby facilitated the production of a continuous web which could then be cut into deactivatable anti-pilferage markers of any required size.

EXAMPLE 3

Figure 1B:
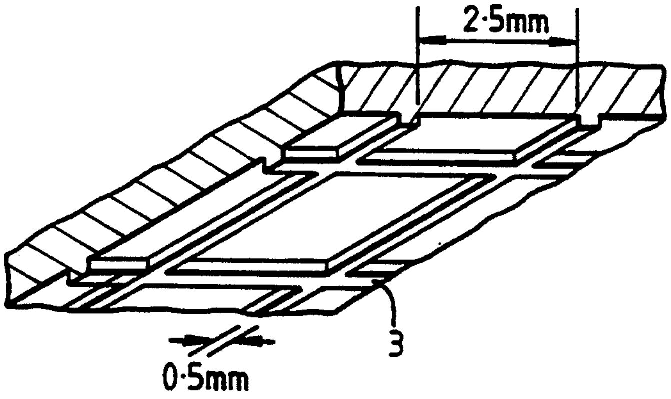
Figure 2:
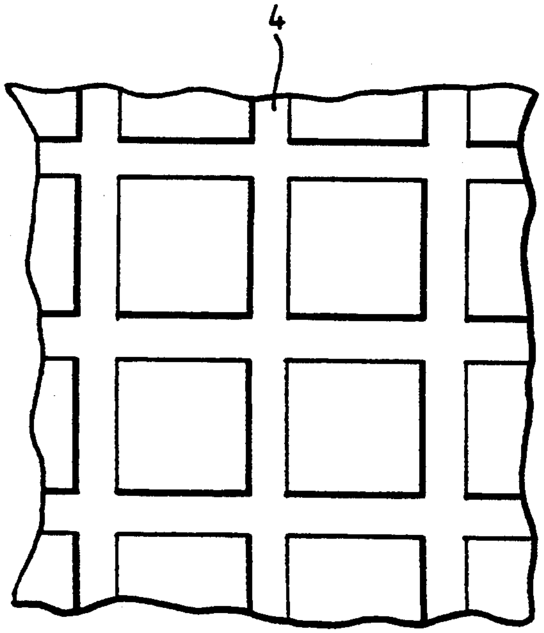
FIG. 2 illustrates the pattern resulting from the use of the tool of FIG. 1 in the cold working of a metal foil.
Figure 3:
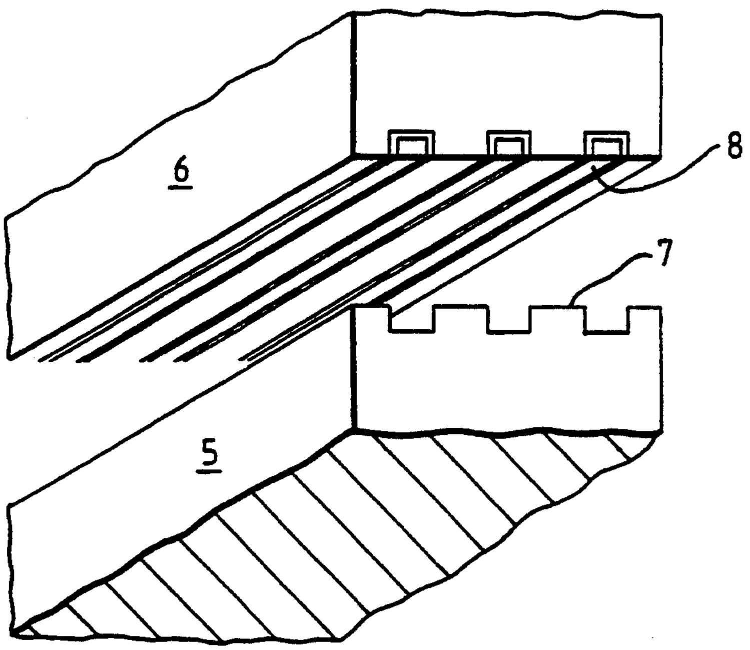
FIG. 3 shows a schematic view of a heated press used for selectively annealing predetermined areas of a metal foil.
Figure 4:
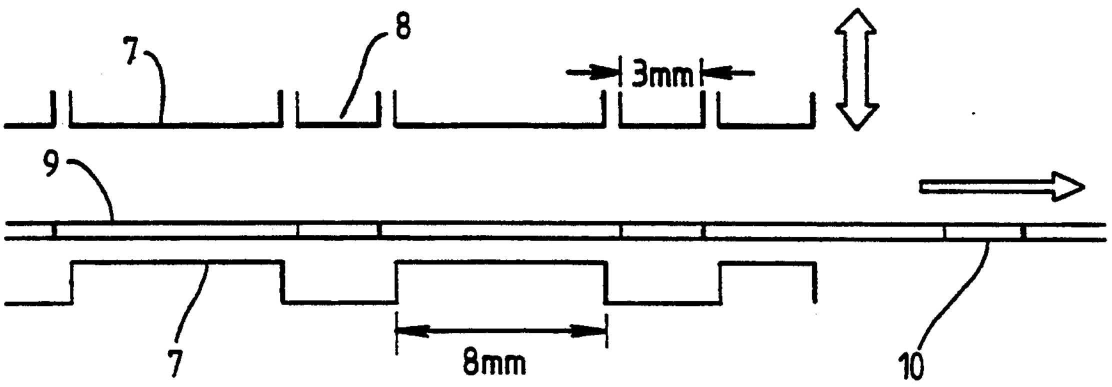
FIG. 4 illustrates schematically the result of using the press of FIG. 3.

This Example describes the manufacture of a structurally continuous deactivation foil which is rendered magnetically discontinuous by a selective cold working process. The same nickel foil as that employed in Example 1 was used in this Example. The foil, of width 50 cm, was fed into a flatbed parallel press as illustrated in FIGS. 1*a* and 1*b*. The press tool consisted of a lower face 1 formed of a mild steel which was machined to be smooth and flat; and an upper face 2 which was formed with a mesh of lines 3 arranged in a square grid array, the side of the square being 2.5 cm. The upper face 2 was formed of a tool grade steel, and the square grid pattern 3 was formed by machining the array of grid lines to a depth of 0.5 mm. (see FIG. 1*b*). The press tool 1, 2 covered an area of 50 cm×2 cm, so that by feeding the nickel foil through the press in a direction normal to the long side of the tool, and advancing the foil in steps of 2 cm after each pressing operation, the entire continuous roll of foil could be treated easily. The result of using this press tool was to form a roll of foil carrying a deformation pattern 4 (see FIG. 2) throughout its width and length, the pattern conforming to that of the grid array of FIG. 1*b*. In order to achieve the desired degree of plastic deformation in the lines 4 of the treated foil, without requiring cutting or significant bending of the foil, it was found that a press force in the range of 20 to 100 tons weight per stroke of the press tool was required. Advantageously, the force was about 50 tons force. Below the lower limit of 20 tons, the resultant plastic deformation was insufficient to cause an adequate disruption of any magnetic circuit in the plane of the foil. The resultant continuous foil roll of deactivating material was then laminated to an active magnetic material (in the form of a foil) in a continuous process as described above in Example 2.

EXAMPLE 4

A nickel foil was pressed with a deformation pattern, as described above in Example 3, but in this Example a rotary embossing-type process was used in place of the flatbed press of FIG. 1. The cylindrical rotary roller tools were of similar materials and patterns to those described in Example 2, but lower forces, in the range 2–10 tons force, were necessary because the instantaneous contact area was smaller in this example. This produced a similar material to that described in Example 3 but the foil could be processed more quickly and there was less tool wear in the rotary process.

We claim:

1. A magnetically active tag or marker which comprises a substrate; an 'active' magnetic material which is a soft magnetic material having a high magnetic permeability and a low coercive force; and a deactivating material which is a hard or semi-hard magnetic material having a moderate or high coercive force and a moderate magnetic permeability, whereby the deactivating material, when subjected to a sufficiently high magnetizing force, is able to clamp the magnetic properties of the 'active' material so as to deactivate the 'active' material, characterized in that said deactivating material consists of nickel with a columnar crystal grain structure and substantially isotropic magnetic properties in the plane of said substrate, said deactivating material being formed by electrodeposition, electroforming or electroless chemical deposition.

2. A tag or marker as claimed in claim 1, characterised in that said deactivating material is formed as a discontinuous foil or layer or as a plurality of islands carried by a substrate, by means of an electrodeposition process in which selective deposition is achieved by a masking technique.

3. A tag or marker as claimed in claim 1, characterized in that said deactivating material is planar and has a columnar grain structure and substantially isotropic magnetic properties in the plane of said deactivating material.

4. A tag or marker as claimed in 1, characterised in that said columnar grain structure is coated with a thin layer of a planar crystal grain structure.

5. A tag or marker as claimed in claim 1, characterised in that said deactivating material is subjected to a deformation process after being formed by an electrodeposition method.

6. A tag or marker as claimed in claim 1, characterised in that said deactivating material has been subjected to a stamping, rolling, pressing or embossing process.

7. A tag or marker as claimed in claim 1, characterised in that said deactivating material is subjected to mechanical deformation or cold working.

8. A tag or marker as claimed in claim 1, characterised in that a portion of the area of said deactivating material has been subjected to said deformation process.

* * * * *